United States Patent
Dieckmann et al.

(10) Patent No.: US 11,391,329 B2
(45) Date of Patent: Jul. 19, 2022

(54) TRANSMISSION MECHANISM FOR ACTUATING A FRICTION CLUTCH

(71) Applicant: ZF CV Systems Hannover GmbH, Hannover (DE)

(72) Inventors: Thomas Dieckmann, Pattensen (DE); Gerd Schünemann, Laatzen (DE); Robin Gucia, Hannover (DE)

(73) Assignee: ZF CV Systems Hannover GmbH, Hannover (DE)

( * ) Notice: Subject to any disclaimer, the term of this patent is extended or adjusted under 35 U.S.C. 154(b) by 0 days.

(21) Appl. No.: 17/277,325

(22) PCT Filed: Aug. 12, 2019

(86) PCT No.: PCT/EP2019/071548
§ 371 (c)(1),
(2) Date: Mar. 18, 2021

(87) PCT Pub. No.: WO2020/064198
PCT Pub. Date: Apr. 2, 2020

(65) Prior Publication Data
US 2022/0034372 A1   Feb. 3, 2022

(30) Foreign Application Priority Data

Sep. 24, 2018 (DE) ..................... 10 2018 123 412.0

(51) Int. Cl.
*F16D 25/12* (2006.01)
*F16D 13/75* (2006.01)
*F16D 65/56* (2006.01)

(52) U.S. Cl.
CPC ......... *F16D 25/126* (2013.01); *F16D 13/752* (2013.01); *F16D 65/56* (2013.01)

(58) Field of Classification Search
CPC .............................. F16D 25/126; F16D 13/752
See application file for complete search history.

(56) References Cited

U.S. PATENT DOCUMENTS 3,946,845 A * 3/1976 Kamio ................. F16D 13/752
                                              192/70.252
4,304,322 A * 12/1981 Beccaris ................. F16C 1/22
                                              188/196 B
(Continued)

FOREIGN PATENT DOCUMENTS

DE  2140516 A1   3/1972
DE  3719400 A1   12/1988
(Continued)

OTHER PUBLICATIONS

European Patent Office, Rijswijk, Netherlands, International Search Report of International Application No. PCT/EP2019/071548, dated Dec. 5, 2019, 2 pages.

*Primary Examiner* — Huan Le
(74) *Attorney, Agent, or Firm* — Dickinson Wright PLLC

(57) ABSTRACT

A transmission mechanism for actuating a friction clutch, which can be disengaged against a spring force and is arranged between an internal combustion engine and a manual transmission, includes two lockable elements that are movable toward one another longitudinally to automatically change the length and compensate for clutch wear. The first element consists of a spindle which is coupled to a non-rotatable component of a disengagement mechanism of the friction clutch in a rotationally fixed and axially displaceable manner and has a steep-pitch external thread. The second element consists of a nut having a steep-pitch internal thread into which the spindle can be screwed, the pitch of the steep-pitch thread being dimensioned in such a way that no self-locking can occur between the two elements.

9 Claims, 2 Drawing Sheets

(56) References Cited

U.S. PATENT DOCUMENTS

| | | | | | |
|---|---|---|---|---|---|
| 4,735,298 | A | * | 4/1988 | Hauguel | F16D 25/126 188/196 A |
| 5,265,710 | A | * | 11/1993 | Gabas | F16C 1/22 192/111.12 |

FOREIGN PATENT DOCUMENTS

| | | |
|---|---|---|
| DE | 102007031740 A1 | 2/2008 |
| DE | 102007010765 A1 | 9/2008 |
| DE | 102011085836 A1 | 5/2012 |
| DE | 102014217390 A1 | 3/2016 |
| DE | 102015107787 A1 | 11/2016 |
| DE | 102016123777 A1 | 12/2017 |
| EP | 0058833 A1 | 9/1982 |

\* cited by examiner

TRANSMISSION MECHANISM FOR ACTUATING A FRICTION CLUTCH

TECHNICAL FIELD

The invention relates to a transmission mechanism for actuating a friction clutch which can be disengaged against a spring force and is arranged between an internal combustion engine and a manual transmission, which mechanism comprises two lockable elements which can be moved toward one another longitudinally to automatically change the length and compensate for clutch wear.

BACKGROUND

A transmission mechanism of this type is known from DE 37 19 400 A1. This document relates to a device for actuating a friction clutch which can be disengaged against a spring force and comprises a transmission mechanism which can be operated by pressure medium, said mechanism comprising a piston to which pressure medium can be applied and which is arranged in a cylinder, and a piston rod, the transmission mechanism being arranged between a pressure medium chamber delimited by the piston, and a disengagement element for disengaging the friction clutch. The transmission mechanism comprises two parts which can be moved toward one another longitudinally to change the length of the transmission mechanism in the event of clutch wear.

The two longitudinally movable parts can be moved toward one another by means of a self-locking screw connection, and there is a drive for twisting the two longitudinally movable parts relative to one another. A one-way clutch is arranged between the drive for twisting the two parts relative to one another. A drive device converting the movement of the transmission mechanism is used as the drive. The drive device has a first guide part which extends obliquely to the direction of movement of the transmission mechanism, and a second guide part which can be brought into engagement with the first guide part. One guide part is operatively connected to the one-way clutch, whereas the other guide part is arranged in a stationary manner with respect to the transmission mechanism.

This device is a feasible option, but it is limited to a design comprising an integrated, in particular pneumatic clutch actuator, and thus requires a greater installation space on the friction clutch. Furthermore, the self-locking screw connection between the two parts which can be moved toward one another longitudinally, the one-way clutch and the drive of the two parts which can be moved toward one another longitudinally are friction-related components which can lead to an imprecise response to a specific clutch actuation and to clutch wear as a result of the mutual friction effects thereof.

SUMMARY

In this context, the present disclosure addresses the problem of presenting a transmission mechanism for actuating a friction clutch which can be disengaged against a spring force and is arranged between an internal combustion engine and a manual transmission, the friction clutch being simpler, more compact and more cost-effective to produce in comparison with the known solution mentioned above. In addition, the new transmission mechanism can be used with pneumatic, hydraulic or electromechanical clutch actuators without structural modification, wherein, at the same time, it is ensured that, by means of an automatic length change of the two lockable elements which can be moved toward one another longitudinally, an actuation path of the transmission mechanism which is as consistent as possible is preserved in the event of clutch wear, without this being adversely affected by unfavorable mutual friction effects.

The invention accordingly relates to a transmission mechanism for actuating a friction clutch which can be disengaged against a spring force and is arranged between an internal combustion engine and a manual transmission, which mechanism comprises two lockable elements which can be moved toward one another longitudinally to automatically change the length and compensate for clutch wear.

The first element consists of a spindle which is coupled to a non-rotatable component of a disengagement mechanism of the friction clutch in a rotationally fixed and axially movable manner and has a steep-pitch external thread, that the second element consists of a nut having a steep-pitch internal thread which is complementary thereto, into which the spindle can be screwed, the pitch of the steep-pitch thread being dimensioned in such a way that no self-locking can occur between the two elements, that the nut is arranged in a hollow casing which is immovably fixed to a controlling element of a pneumatic, hydraulic or electromechanical clutch actuator, in that the casing has an axially parallel multi-toothed profile which is directed radially inwards over a length which substantially corresponds to the actuation path of the friction clutch, with which profile the nut interacts in a non-rotatable manner by means of a polygonal collar which protrudes radially beyond a cylindrical region of the nut when the friction clutch is disengaged, that the casing has a free region without a multi-toothed profile at the end of the actuation path which corresponds to the engaged state of the friction clutch, in which region the polygonal collar of the nut is freely rotatable when a spring force is applied thereto during the engagement of the friction clutch, and can be rotated relative to the spindle toward an end fitting on the casing in accordance with a change in length as a result of clutch wear that has occurred.

When adjusting the clutch wear using the clutch plate, in addition to the actuation path, a wear compensation path must be maintained, which can be more than double the actuation path. For example, in one specific application, the actuation path can be 25.6 mm, whereas the wear compensation path can be 64.4 mm, which results in a total path of 90 mm. Without separate wear adjustment in the clutch plate, the drive of the clutch plate must disadvantageously apply the total path. If a separate wear adjustment is integrated in the clutch plate, then the drive only has to apply the actuation path, with the corresponding advantages with respect to energy consumption, size and actuation speed. This is achieved by means of the transmission mechanism according to the invention, this mechanism being simpler, more compact and more cost-effective to produce than the transmission mechanism described at the outset.

The disengagement of the friction clutch can advantageously take place along the actuation path by a non-rotational displacement of the nut in the casing by means of a tappet which is operatively connected to the nut and to the disengagement mechanism. For this purpose, the spindle, at the end of the region having the steep-pitch external thread, has a stop flange which overlaps an end face of the nut at least in part, on which stop flange one end and the opposite end of a bias spring arranged in an internal bore in the tappet are supported.

For the length compensation function, a positioning spring is arranged between a casing cover of the casing, which cover is remote from the tappet, and the polygonal collar on the nut.

To reduce friction between the nut and the casing, in the free, geometrically approximately annular-groove-shaped region of the casing between the polygonal collar on the nut and an inner flange on the casing and/or between the polygonal collar on the nut and the stop flange on the spindle and/or between the polygonal collar on the nut and the end of the positioning spring, a thrust bearing in the form of a slide, ball or needle bearing can be arranged.

To be able to accommodate the total possible wear compensation path of the friction clutch, the length of the internal bore in the tappet is at least equal to the maximum adjustable wear compensation path of the friction clutch plus the block length of the bias spring and the thickness of the stop flange on the spindle.

By means of the above-mentioned features, the transmission mechanism according to the invention is modularly formed as a unit to be arranged in an interchangeable manner between a pneumatic, hydraulic or electromechanical clutch actuator and a disengagement mechanism of the friction clutch.

The present disclosure also relates to a motor vehicle or rail vehicle, comprising a transmission mechanism of the type defined above for actuating a friction clutch which can be disengaged against a spring force and is arranged between an internal combustion engine and a manual transmission.

For greater clarity with regard to the invention, a drawing with an exemplary embodiment is appended to the description.

DETAILED DESCRIPTION OF THE DRAWINGS

Figure 1:
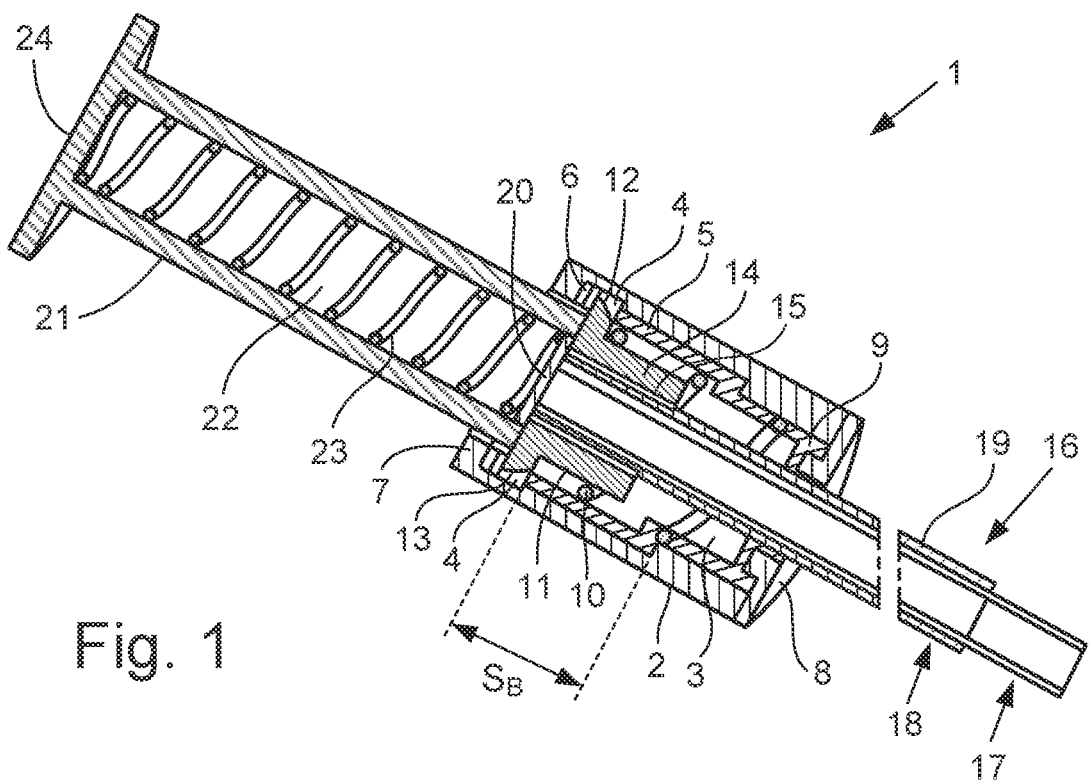
FIG. 1 is a longitudinal sectional view of the transmission mechanism according to the invention in the unactuated state, even if no wear has yet occurred in the friction clutch.

The transmission mechanism 1 shown in FIG. 1 for actuating a friction clutch (not visible) which can be disengaged against a spring force and is arranged between an internal combustion engine and a manual transmission, comprises two lockable elements which can be moved toward one another longitudinally, in particular a nut 11 and a spindle 16, which are used to automatically change the length in the event of clutch wear. The first element consists of a spindle 16 which is coupled to a non-rotatable component of a disengagement mechanism of the friction clutch in a rotationally fixed and axially displaceable manner and has a steep-pitch external thread 19 which can be screwed into a steep-pitch internal thread 15, which is complementary thereto, of the second element consisting of a nut 11. In this case, the pitch of the two steep-pitch threads 15, 19 is dimensioned in such a way that no self-locking can occur between these two elements, namely the nut 11 and the spindle 16. At the axial end thereof which is remote from the nut, the spindle 16 comprises a non-circular end region 17 which is preferably polygonal and is arranged in a non-rotational, axially displaceable manner in a non-rotating actuator assembly of the friction clutch. At the opposite axial end of the spindle 16, that is to say at the end of the region 18 which is remote from the cover and comprises the steep-pitch external thread 19, a stop flange 20 is arranged, which overlaps the nut 11 radially in part at the associated axial end thereof.

The nut 11 is arranged in a casing 2 which is connected to a housing (not shown) of a clutch actuator. The casing 2 is hollow cylindrical and comprises, at one axial end thereof, a clearance 3 delimited by a casing cover 8, through the opening of which the spindle 16 is guided into the casing 2. Over a length $S_B$ which substantially corresponds to the actuation path of the friction clutch, the wall of this clearance 3 has an axial multi-toothed profile 5 which is used to secure the nut 11 against rotation in the casing 2. For this purpose, the nut 11 comprises, at one axial end, a radially outwardly protruding polygonal collar 12, which is preferably in the form of a hexagonal collar.

This polygonal collar 12, which has a shorter axial length in comparison with the length of the nut 11, in the case of an unactuated transmission mechanism, ends up in the end position shown in FIG. 1 in a geometrically approximately annular-groove-shaped region 4 which is free from the multi-toothed profile 5, in which region the nut 11, together with the polygonal collar 12 thereof, can freely rotate. This free region 4 is axially delimited by a radially inwardly projecting inner flange 7 on the casing 2, through which a hollow tappet 21 is guided. On this tappet 21, the nut 11 is axially supported in the upper position thereof, and the tappet 21 is axially displaceable by means of a clutch actuator (not shown).

Between the polygonal collar 12 of the nut 11 and the inner flange 7 of the casing 2, a thrust bearing 6 in the form of a slide, ball or needle bearing is formed or arranged to reduce the friction between the tappet 21 and the nut 11 when the nut rotates by a corresponding amount relative to the spindle 16 under the effect of the axial spring force of a positioning spring 10 in the form of a helical compression spring to compensate for the clutch wear. The positioning spring 10 is arranged in the clearance 3 of the casing 2, radially outwardly encompasses the nut 11 in the cylindrical region 14 thereof, and the one axial end thereof is supported on the lower face, which is remote from the tappet, of the polygonal collar 12 of the nut 2. By means of the other axial end thereof, the positioning spring 10 is supported on an insert 9 which is inserted in the clearance 3 of the casing 2 and, in the portion thereof which is close to the tappet, has the axial multi-toothed profile 5. The casing 2 is closed at the end remote from the tappet by a casing cover 8.

The polygonal collar 12 is provided with insertion bevels 13 so that, when the nut 11 is displaced by means of the tappet 21 toward the casing cover 8, at least one point of the polygonal collar 12 can be inserted in the multi-toothed profile 5 more easily. As a result, a rotationally fixed connection between the nut 11 and the casing 2 is ensured when dealing with an actuation path $S_B$ during the disengagement of the friction clutch. Since, in a rotationally fixed arrangement of the friction clutch, the spindle 16 is also held in a rotationally fixed manner, the position of the nut 11 relative to the spindle 16 cannot change during the actuation of the friction clutch.

The tappet 21 comprises an internal bore 22 for guiding the stop flange 20 of the spindle 16 and for guiding a bias spring 23 in the form of a helical compression spring which is axially supported on the stop flange 20 of the spindle 16 and on a tappet cover 24.

Figure 2:
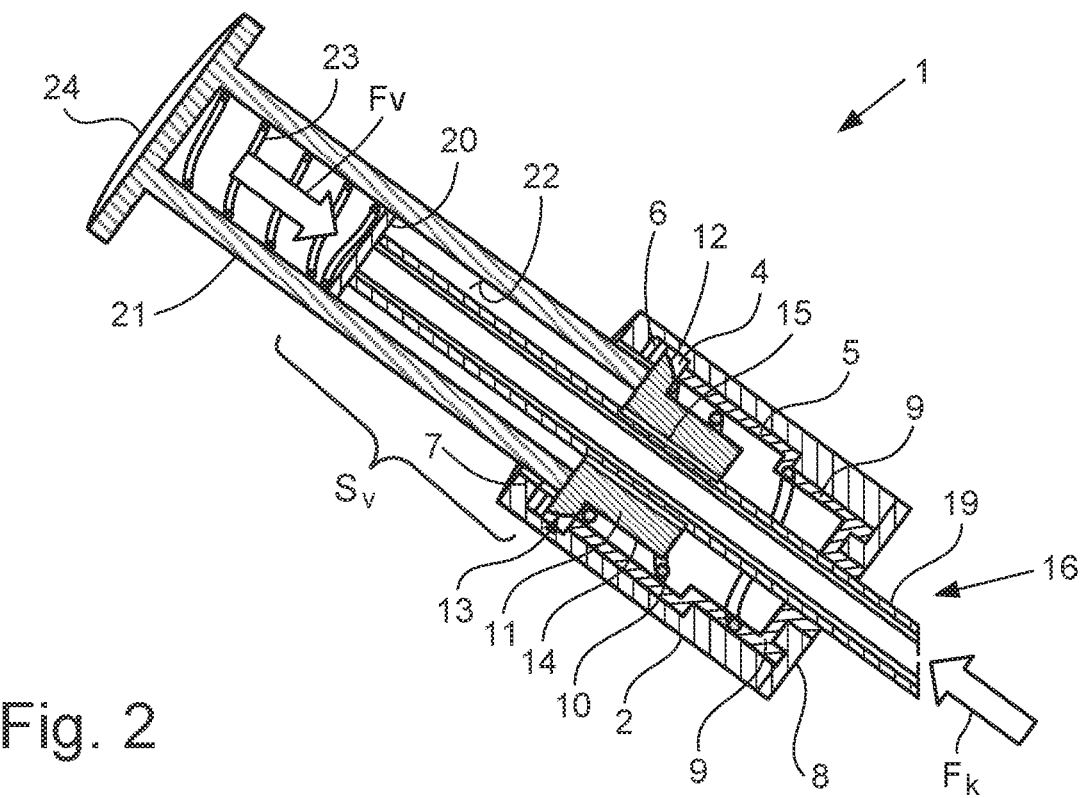
FIG. 2 is a longitudinal sectional view through the transmission mechanism according to FIG. 1 with the adjusted, maximum possible wear compensation path.

FIG. 2 shows how far the spindle 16 can screw through the nut 11 until the maximum adjustable wear compensation path $S_V$ is completed.

To additionally reduce the internal friction in the transmission mechanism when adjusting the clutch wear, additional thrust bearings in the form of a slide, ball or needle bearing can be formed or arranged between the polygonal collar 12 on the nut 11 and the stop flange 20 on the spindle 16 and between the polygonal collar 12 on the nut 11 and the one axial end of the positioning spring 10. Furthermore, the steep-pitch thread on the nut 11 and on the spindle 16 can be in the form of a ball thread.

Figure 3:
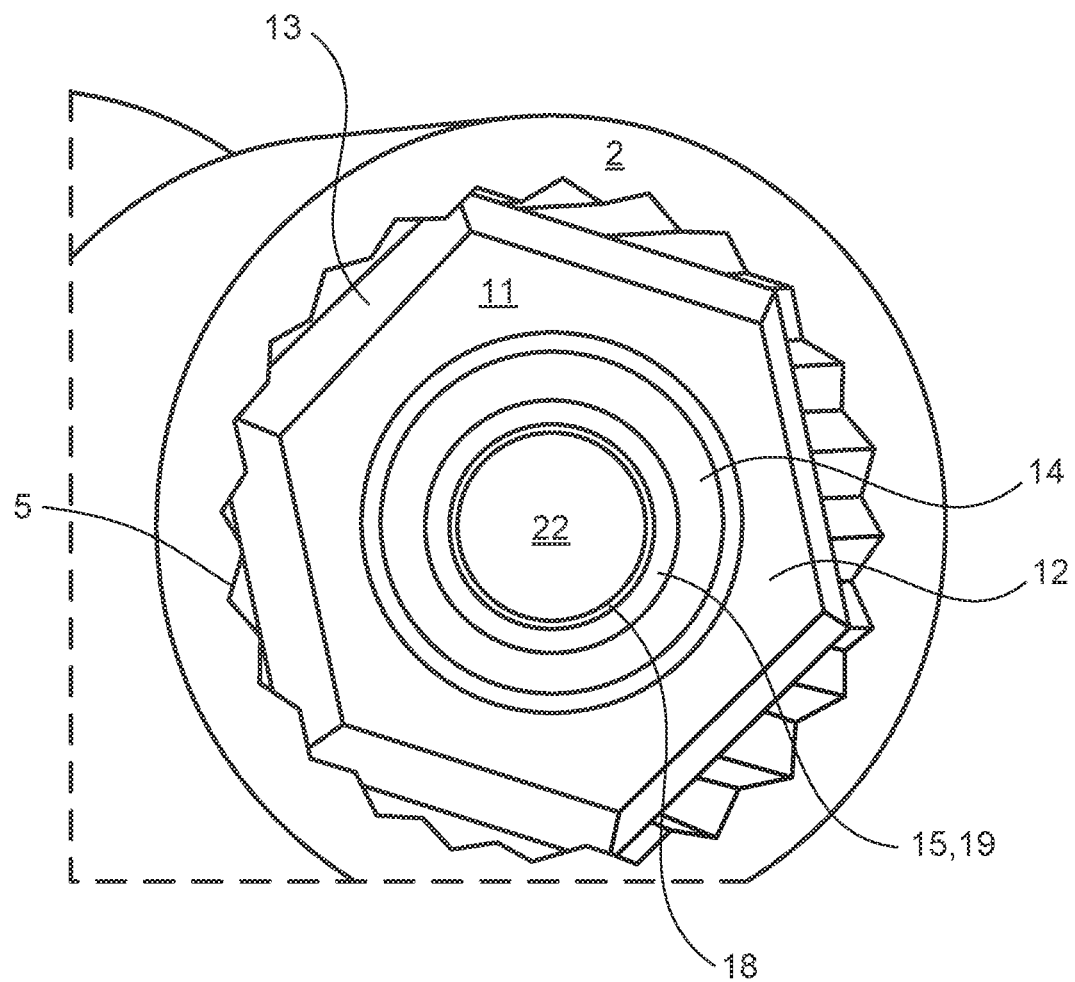
FIG. 3 is a schematic, end-face plan view of a nut arranged in a casing of the transmission mechanism according to FIG. 1.

The transmission mechanism 1 according to the invention ensures the required wear compensation of the friction clutch by means of a non-self-locking screw connection combination of the nut 11 and the spindle 16 which, in an unactuated state, brings about a length compensation by rotating the nut 11 relative to the spindle 16 and, in an actuated state, is a pressure-tight and rotationally fixed connection, since the nut 11 can then be displaced while secured against rotation by the engagement of the polygonal collar 12 thereof in the multi-toothed profile 5 of the casing 2 (FIG. 3). In this case, the spindle 16 cannot rotate relative to the nut 11, since this spindle is axially guided in only a displaceable manner through the non-circular end region 17 of the spindle 16 in the non-rotatable component of the disengagement mechanism.

The nut 11 is guided in the casing 2 in such a way that, in the unactuated state of the clutch actuator, the nut can freely rotate in the free, annular-channel-type region 4 of the casing 2 and, in the actuated state of the clutch actuator, is prevented from rotating by the engagement of the polygonal collar 12 of the nut 11 in the axial multi-toothed profile 5 of the casing 2. In the unactuated state of the transmission mechanism 1, the force $F_K$ applied by the clutch mechanism can axially displace the spindle 16, since the force is not impeded from doing so by the nut 11. As soon as the spindle 16 has been axially displaced far enough that, at the pressure point of the clutch actuation, an equilibrium of forces with the spring force $F_V$ of the bias spring 23 in the tappet 21 is produced, the maximum adjustment path in this situation is completed. In the unactuated state of the transmission mechanism 1, the ideal length thereof can thus always be readjusted, the length compensation being able to take place in both directions. If the clutch actuator is then actuated again, the nut 11 is once again displaced into the rotationally secured region of the multi-toothed profile 5 of the casing 2, and, in this case, the nut 11 carries along the spindle 16 without changing the adjustment path previously taken into consideration.

The invention claimed is:

1. A transmission mechanism (1) for actuating a friction clutch which can be disengaged against a spring force and is arranged between an internal combustion engine and a manual transmission, the transmission mechanism comprising:
   a first lockable element (16) and a second lockable element (11) configured to be moved toward one another longitudinally to automatically change a length and to compensate for clutch wear,
   wherein the first lockable element is a spindle (16) coupled to a non-rotatable component of a disengagement mechanism of the friction clutch in a rotationally fixed and axially movable manner and has a region (18) with a steep-pitch external thread (19),
   wherein the second lockable element is of a nut (11) having a steep-pitch internal thread (15) complementary to the steep-pitch external thread (19) of the spindle (16),
   wherein the internal and external steep-pitch threads (15, 19) have a pitch dimensioned in such a way that no self-locking can occur between the two elements (11, 16),
   wherein the nut (11) is arranged in a hollow casing (2) immovably fixed to a controlling element of a pneumatic, hydraulic or electromechanical clutch actuator,
   wherein the casing (2) has an axially parallel multi-toothed profile (5) directed radially inwards over a length which substantially corresponds to an actuation path ($S_B$) of the friction clutch,
   wherein the nut (11) interacts with the multi-toothed profile (5) in a non-rotatable manner via a polygonal collar (12) which protrudes radially beyond a cylindrical region (14) of the nut (11) when the friction clutch is disengaged,
   wherein the casing (2) has a free region (4) without a multi-toothed profile (5) at an end of the actuation path ($S_B$) which corresponds to an engaged state of the friction clutch,
   wherein the polygonal collar (12) of the nut (11) is freely rotatable in the free region (4) when a spring force is applied to the polygonal collar (12) while the friction clutch is engaged, and is rotatable relative to the spindle (16) toward an end fitting (7) on the casing (2) by an adjustable wear compensation path ($S_V$) corresponding to a change in length as a result of clutch wear that has occurred.

2. The transmission mechanism as claimed in claim 1 further comprising a tappet (21) for disengaging the friction clutch over the actuation path ($S_B$) as a result of axial displacement in a non-rotational manner of the nut (11) in the casing (2), wherein the tappet (21) is operatively connected to the nut (11) and to the disengagement mechanism of the clutch.

3. The transmission mechanism as claimed in claim 2 wherein the spindle (16), has a stop flange at an end of the region (18) with the steep-pitch external thread (19), wherein the stop flange (20) overlaps, at least partially, with an end face of the nut (11),
further comprising a bias spring (23) arranged in an internal bore (22) in the tappet (21) supported at one end by the stop flange and supported at an opposite end on a tappet cover (24).

4. The transmission mechanism as claimed in claim 2, further comprising a positioning spring (10) arranged between a casing cover (8) of the casing (2) and the nut (11), the casing cover (8) being remote from the tappet (21) and from the polygonal collar (12) of the nut (11).

5. The transmission mechanism as claimed in claim 3, wherein the length of the internal bore (22) in the tappet (21) is at least equal to a maximum adjustable wear compensation path ($S_V$) of the friction clutch plus a block length of the bias spring (23) and a thickness of the stop flange (20) on the spindle (16).

6. The transmission mechanism as claimed in claim 1, further comprising a thrust bearing (6) in the form of a slide bearing, ball bearing, or needle bearing is arranged adjacent the polygonal collar.

7. The transmission mechanism as claimed in claim 6, wherein the thrust bearing is arranged in the free region (4)

of the casing (2) between the polygonal collar (12) of the nut (11) and the inner flange (7) of the casing (2).

8. The transmission mechanism as claimed in claim 1, wherein the transmission mechanism (1) is modularly formed as a unit to be exchangeably arranged between the pneumatic, hydraulic or electromechanical clutch actuator and the disengagement mechanism of the friction clutch.

9. A motor vehicle or rail vehicle, comprising the manual transmission, the internal combustion engine, and the transmission mechanism (1) as claimed in claim 1, wherein the transmission mechanism is arranged between the internal combustion engine and the manual transmission.

* * * * *